US012603902B2

(12) United States Patent
　　Kim et al.

(10) Patent No.:　US 12,603,902 B2
(45) Date of Patent:　Apr. 14, 2026

(54) APPARATUS AND METHOD FOR CONSTRUCTING INTRUSION DETECTION SYSTEM APPLIED TO CAN COMMUNICATION USING DETECTION POLICY RULE

(71) Applicant: AUTOCRYPT CO., LTD., Seoul (KR)

(72) Inventors: Duk Soo Kim, Seoul (KR); Eui Seok Kim, Seoul (KR); Sang Gyoo Sim, Seoul (KR); Ki Ho Joo, Seoul (KR); Jung Won Lee, Seongnam-si (KR); Jong Guk Lee, Suwon-si (KR); Jung Wook Kim, Seoul (KR); Sang Seok Lee, Seoul (KR); Yeong Wan Seo, Seoul (KR); Si Ho Ha, Seoul (KR); Yeong Dae Lee, Seoul (KR)

(73) Assignee: AUTOCRYPT CO., LTD., Seoul (KR)

( * ) Notice: Subject to any disclaimer, the term of this patent is extended or adjusted under 35 U.S.C. 154(b) by 8 days.

(21) Appl. No.: 18/780,389

(22) Filed: Jul. 22, 2024

(65) Prior Publication Data

US 2025/0088519 A1　　Mar. 13, 2025

(30) Foreign Application Priority Data

Sep. 13, 2023　(KR) ........................ 10-2023-0121505

(51) Int. Cl.
　　*H04L 9/40*　　　(2022.01)
(52) U.S. Cl.
　　CPC ................................ *H04L 63/1416* (2013.01)
(58) Field of Classification Search
　　CPC .. H04L 63/1416; H04L 63/1408; H04L 63/14

USPC ............................................................ 726/1
See application file for complete search history.

(56) References Cited

U.S. PATENT DOCUMENTS

| | | | | |
|---|---|---|---|---|
| 9,479,523 | B2 * | 10/2016 | Altman | .............. H04L 63/1416 |
| 2006/0136493 | A1 * | 6/2006 | Muralidharan | ..... G06F 21/6227 |
| 2008/0263180 | A1 * | 10/2008 | Hurst | .................. H04L 67/1001 |
| | | | | 709/224 |
| 2011/0247072 | A1 * | 10/2011 | Staniford | ............ H04L 63/1491 |
| | | | | 726/24 |
| 2021/0099470 | A1 * | 4/2021 | Lin | ..................... H04L 63/1416 |
| 2022/0044218 | A1 * | 2/2022 | Maeng | ................. G06Q 20/102 |
| 2022/0374515 | A1 | 11/2022 | Bridges et al. | |
| 2023/0109507 | A1 | 4/2023 | Kim et al. | |

(Continued)

FOREIGN PATENT DOCUMENTS

| | | | | |
|---|---|---|---|---|
| CN | 112363984 | A | 2/2021 | |
| CN | 114253479 | A * | 3/2022 | ............. H04L 69/04 |

(Continued)

*Primary Examiner* — Kaylee J Huang
(74) *Attorney, Agent, or Firm* — NKL LAW; Jae Youn Kim

(57)　　　　　　　ABSTRACT

Disclosed are an apparatus and method for constructing an intrusion detection system applied to CAN communication. The method for constructing an intrusion detection system applied to CAN communication may include extracting standard information by parsing an input file associated with CAN communication, setting a policy rule by applying at least one of a static ruleset and a custom ruleset using the extracted standard information, and creating a policy file to be applied to the intrusion detection system by packing the standard information and the policy rule.

10 Claims, 13 Drawing Sheets

10

(56) References Cited

U.S. PATENT DOCUMENTS

| | | | | |
|---|---|---|---|---|
| 2023/0247003 A1* | 8/2023 | Chanak | ................. | H04L 9/3226 726/1 |
| 2024/0137372 A1* | 4/2024 | Leung | ................. | H04L 63/1416 |

FOREIGN PATENT DOCUMENTS

| | | | | | |
|---|---|---|---|---|---|
| CN | 114374565 A | * | 4/2022 | ......... | H04L 63/1416 |
| KR | 10-2023-0094513 A | | 6/2023 | | |

* cited by examiner

10

| | | BUS Load Too High | BUS Load Too Low | Unknown Arbitration n id | Signal Correlation Error | DOS Attack | Unknown Diag ID | Diag flooding | Diag Scanning | Recv Unknown ECU message | Shorter Data Length Error | Longer Data Length Error | Anomaly Cycle | Invalid Diag Message |
|---|---|---|---|---|---|---|---|---|---|---|---|---|---|---|
| | a | yes | yes | yes | yes | yes | yes | yes | yes | yes | yes | yes | yes | yes |
| | b | o | o | o | o | o | o | o | o | o | | | | |
| BUS | | | | | | | | | | | | | | |
| Message | periodic | | | | | | | | | | o | o | | |
| | event | | | | | | | | | | o | o | o | |
| | periodic-event | | | | | | | | | | o | o | | o |
| | const | | | | | | | | | | | | | |
| | crc | | | | | | | | | | | | | |
| | checksum | | | | | | | | | | | | | |
| Signal | counter | | | | | | | | | | | | | |
| | enum | | | | | | | | | | | | | |
| | sensor | | | | | | | | | | | | | |
| | binary | | | | | | | | | | | | | |

FIG. 4A

| | | Signal space violation | CRC | Counter | Enum | Overflow | Underflow | Custom Condition | Invalid Change Rate |
|---|---|---|---|---|---|---|---|---|---|
| BUS | a | | | | | | | | |
| | b | | * yes | | yes | yes | yes | yes | yes |
| Message | periodic | | | | | | | | |
| | event | | | | | | | | |
| | periodic-event | | | | | | | | |
| Signal | const | o | | | | | | | |
| | crc | | o | | | | | | |
| | checksum | | | | | | | | |
| | counter | | | o | | | | | |
| | enum | | | | o | | | o | |
| | sensor | | | | | o | o | o | o |
| | binary | | | | | | | o | |

FIG. 4B

| Rule Name | Rule ID (Detection ID) | Description |
|---|---|---|
| Bus Load Too High | 1 | DETECT WHEN BUS TRAFFIC (mps) IS GREATER THAN OR EQUAL TO REFERENCE VALUE |
| Bus Load Too Low | 2 | DETECT WHEN BUS TRAFFIC (mps) IS SMALLER THAN OR EQUAL TO REFERENCE VALUE |
| Unknown Arb ID (Arbitration) | 3 | DETECT MESSAGE NOT DEFINED IN DBC |
| Siganal Correlation Error | 4 | DETECT ABNORMALITY OF GATEWAY RELAY MESSAGE |
| Recv Unknown ECU Message | 5 | DETECT RECEPTION OF MESSAGE FROM UNKNOWN ECU |
| Detected Dos Attack | 6 | DETECT DENIAL-OF-SERVICE |
| Unknown DIAG ID | 7 | DETECT UNDEFINED DIAGNOSTIC MESSAGE |
| DIAG Message Flooding | 8 | DETECT CONTROLLER DENIAL-OF-SERVICE USING DIAGNOSTIC MESSAGE |
| DIAG Scanning Detected | 9 | DETECT CONTROLLER SCANNING ATTACK USING DIAGNOSTIC MESSAGE |

FIG. 5A

| Rule Name | Rule ID (Detection ID) | Description |
|---|---|---|
| Shorter Data Length Error | 30 | DETECT WHEN MESSAGE LENGTH IS SMALLER THAN SET VALUE |
| Longer Data Length Error | 31 | DETECT WHEN MESSAGE LENGTH IS GREATER THAN SET VALUE |
| Anomaly Cycle | 32 | DETECT MESSAGE OUTSIDE NORMAL CYCLE |
| Invalid DIAG Message | 33 | DETECT INVALID DIAGNOSTIC MESSAGE |

FIG. 5B

| Rule Name | Rule ID (Detection ID) | Description |
|---|---|---|
| Signal Space Violation | 60 | DETECT WHEN BIT AREA NOT ALLOWED IS USED |
| CRC Signal Error | 61 | DETECT CRC ERROR |
| Counter Signal Seq Error | 62 | DETECT COUNTER SEQUENCE ERROR |
| Enum Signal Error | 63 | DETECT WHEN BEING NOT ENUMERATED VALUE ALLOWED FOR DETECTION POLICY OF SIGNAL |
| Signal Overflow | 64 | DETECT WHEN BEING LESS THAN LOWER BOUND OF SIGNAL |
| Signal Underflow | 65 | DETECT WHEN EXCEEDING UPPER BOUND OF SIGNAL |
| Anomaly Change Rate | 66 | DETECT WHEN CHANGE RATE IN SIGNAL VALUE IS GREATER THAN OR EQUAL TO SET VALUE |

FIG. 5C

| Rule Name | Rule ID (Detection ID) | Description |
|---|---|---|
| GEAR P + WHEEL ROTATION | 100 | WHEN WHEEL ROTATES WHILE SHIFT LEVER IS LOCATED IN P |
| WHEN THERE IS LARGE DIFFERENCE IN ROTATION SPEED OF EACH WHEEL | 101 | WHEN THERE IS ABNORMALLY LARGE DIFFERENCE IN SPEED OF EACH WHEEL |
| VEHICLE OPERATION + BATTERY VOLTAGE | 102 | WHEN VEHICLE IS DRIVING OR BATTERY VOLTAGE BECOMES VERY LOW |
| SIMULTANEOUS OPERATTION OF HOT WIRE SEAT + VENTILATING SEAT | 103 | WHEN IT IS IMPOSSIBLE FOR HOT WIRE AND VENTILATING SEAT TO BE TURNED ON SIMULTANEOUSLY |
| GEAR R + VEHICLE DIRECTION FORWARD | 104 | WHEN WHEEL ROTATES IN FRONT DIRECTION WHILE SHIFT LEVER IS IN REVERSE TO R |
| WHEN TORQUE REQUEST VALUE EXCEEDS LIMIT VALUE | 105 | WHEN TORQUE REQUEST VALUE IS PHYSICALLY IMPOSSIBLE VALUE |
| TEMPERATURE ABNORMAL VALUE | 106 | WHEN ENGINE TEMPERATURE IS OUTSIDE NORMAL RANGE |
| DIFFERENCE BETWEEN SPEED OF VEHICLE AND SPEED OF WHEEL | 107 | WHEN DIFFERENCE BETWEEN DRIVING SPEED OF VEHICLE AND ROTATION SPEED OF EACH WHEEL BECOMES ABNORMALLY LARGE |
| OIL TEMPERATURE OF TRANSMISSION IS ABNORMAL VALUE | 108 | WHEN OIL TEMPERATURE OF TRANSMISSION IS ABNORMALLY HIGH |

| 0 | 1 | 2 | 3 |
|---|---|---|---|
| 0 1 2 3 4 5 6 7 | 8 9 10 11 12 13 14 15 | 16 17 18 19 20 21 22 23 | 24 25 26 27 28 29 30 31 |
| Vehicle type | minor version | major version | |
| detail version | | | |
| created timestamp | | | |
| bus count | | message count | |
| buf-5-rec-num | | buf-10-rec-num | |
| fd-buf-5-num | | fd-buf-10-num | |
| bus number | detection rule flag | maximum load mps | minimum load mps |
| bus number | detection rule flag | maximum load mps | minimum load mps |
| bus number | detection rule flag | maximum load mps | minimum load mps |
| bus number | detection rule flag | maximum load mps | minimum load mps |
| bus number | detection rule flag | maximum load mps | minimum load mps |
| bus number | detection rule flag | maximum load mps | minimum load mps |

FIG. 9

| 1Byte | 0 | Bus detect ON/OFF |
|---|---|---|
| | 1 | Unknown Arbitration ID detect |
| | 2 | Bus load detect |
| | 3 | Invalid DIAG detect |
| | 4 | DoS attack detect |
| | 5 | Unknown DIAG ID detect |
| | 6 | DIAG Flooding detect |
| | 7 | DIAG Scanning detect |

FIG. 10

| 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| lookup key | | | | | | | | | | | | | | | | Policy index | | | | | | | | | | | | | | | |
| BUS ID | | | | | Arbitration ID(CAN Message ID) | | | | | | | | | | | | | | | | | | | | | | | | | | |
| Entry index | | | | | | | | | | | | | | | | | | | | | | | | | | | | | | | |
| Buffer index | | | | | | | | | | | | | | | | | | | | | | | | | | | | | | | |
| Buffer Type | | | | | | | | | | | | | | | | | | | | | | | | | | | | | | | |

FIG. 11

APPARATUS AND METHOD FOR CONSTRUCTING INTRUSION DETECTION SYSTEM APPLIED TO CAN COMMUNICATION USING DETECTION POLICY RULE

CROSS-REFERENCE TO RELATED APPLICATIONS

This application claims the priority of Korean Patent Application No. 10-2023-0121505 filed on Sep. 13, 2023, in the Korean Intellectual Property Office, the disclosure of which is incorporated herein by reference.

BACKGROUND

Field

The present disclosure relates to an apparatus and method for constructing an intrusion detection system applied to CAN communication.

Description of the Related Art

Recently, modules are being actively developed to support detailed driving assistance functions such as self-driving as well as electronic control of automobiles. In particular, for full self-driving automation technology, automotive IT convergence technologies that support sensor technologies such as LiDAR (distance measurement/object recognition sensor) and external communication technology (vehicle to everything (V2X)) are being developed.

In order to effectively transmit various types of information according to various technologies described above, in-vehicle electronic control units (ECUs) may share information and control the vehicle through in-vehicle networks (controller area network (CAN), automotive Ethernet).

Accordingly, the need for security to protect messages transmitted inside and outside the car is also rapidly increasing. For example, intrusion detection systems (IDS) are being developed to detect attacks on the in-vehicle network. However, there is a growing demand for technology that may detect attacks using aperiodic CAN messages and more accurately and efficiently detect the risk of attacks and attacks through the in-vehicle networks.

The background technology of the present disclosure is disclosed in Korean Patent Unexamined Publication No. 10-2023-0094513.

SUMMARY

An object to be achieved by the present disclosure is to provide an apparatus and method for constructing an intrusion detection system applied to CAN communication capable of setting a policy rule for detecting and processing a CAN message linked to a vehicle in various ways.

However, the technical problems to be achieved by the exemplary embodiments of the present disclosure are not limited to the technical problems as described above, and other technical problems may exist.

According to an aspect of the present disclosure, there is provided a method for constructing an intrusion detection system applied to CAN communication, including: extracting standard information by parsing an input file associated with CAN communication; setting a policy rule by applying at least one of a static ruleset and a custom ruleset using the extracted standard information; and creating a policy file to be applied to the intrusion detection system by packing the standard information and the policy rule.

The standard information may include at least one of ECU information, PDU information, message information, signal information, and bus information.

The policy rule may include at least one of a first detection policy associated with the bus information, a second detection policy associated with the message information, and a third detection policy associated with the signal information.

In the step of setting the policy rule, at least some of a plurality of parameters predefined as the static ruleset may be set.

The step of setting the policy rule may include defining custom parameters applicable as the custom ruleset, and determining at least one of a combination of the custom parameters and a set value.

The policy file may be a policy binary file.

The policy binary may be created in a hierarchical structure including policy header information, lookup table information, and policy body information.

The policy file may be applied to at least one of an IDS core layer and an IDS detect layer of the intrusion detection system.

The input file may include a CAN DBC file.

According to another aspect of the present disclosure, there is provided an apparatus for constructing an intrusion detection system applied to CAN communication, including: an input file analysis unit that extracts standard information by parsing an input file associated with CAN communication; a policy setting unit that sets a policy rule by applying at least one of a static ruleset and a custom ruleset using the extracted standard information; and a policy file creation unit that generates a policy file to be applied to the intrusion detection system by packing the standard information and the policy rule.

The policy setting unit may set at least some of a plurality of parameters predefined as the static ruleset.

The policy setting unit may define a custom parameter applicable as the custom ruleset and determine at least one of a combination and set value of the custom parameter.

The means for solving the problem described above are merely exemplary and should not be construed as limiting the present disclosure. In addition to the exemplary embodiments described above, additional exemplary embodiments may exist in the drawings and detailed description of the disclosure.

According to the above-described means for solving the problem of the present disclosure, it is possible to provide the apparatus and method for constructing an intrusion detection system applied to CAN communication capable of setting a policy rule for detecting and processing a CAN message linked to a vehicle in various ways.

However, the effects obtainable herein are not limited to the effects described above, and other effects may exist.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 4A and 4B are exemplary diagrams of parameter types of static rulesets;

FIGS. 5A to 5C are exemplary diagrams of parameters that can be adopted for each of first to third detection policies;

FIG. 7 is an exemplary diagram of adoptable parameters for a custom ruleset;

FIG. 9 is a diagram illustrating a data structure of policy header information of a policy binary;

FIG. 10 is a diagram illustrating a data structure of a bus detection rule flag;

FIG. 11 is a diagram illustrating a data structure of lookup table information of the policy binary;

DETAILED DESCRIPTION OF THE EMBODIMENT

Figure 1:
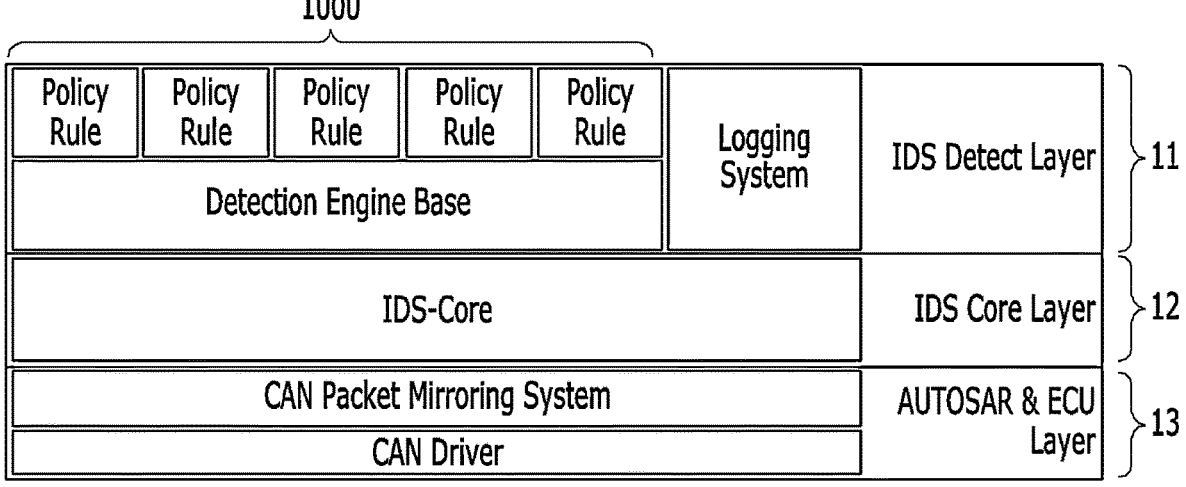
FIGS. 1 and 2 are schematic configuration diagrams of an intrusion detection system according to an exemplary embodiment of the present disclosure.

Hereinafter, exemplary embodiments of the present disclosure will be described in detail with reference to the accompanying drawings so that those skilled in the art to which the present disclosure pertains may easily practice. However, the present disclosure may be implemented in various different forms, and is not limited to the exemplary embodiments described herein. In addition, in the drawings, portions unrelated to the description will be omitted to clearly describe the present disclosure, and similar portions will be denoted by similar reference numerals throughout the specification.

In addition, throughout the present specification, when any one part is referred to as being "connected to" another part, it means that any one part and another part are "directly connected to" each other or are "electrically connected to" or "indirectly connected to" each other with the other part interposed therebetween.

Throughout the present specification, when any member is referred to as being positioned "on", "at upper portion", "at upper end", "below", "at lower portion", "at lower end" of another member, it includes not only a case in which any member and another member are in contact with each other, but also a case in which the other member is interposed between any member and another member.

Through the present specification and claims, unless explicitly described otherwise, "comprising" any components will be understood to imply the inclusion of other components rather than the exclusion of any other components.

The present disclosure relates to an apparatus and method for constructing an intrusion detection system applied to CAN communication.

Figure 2:
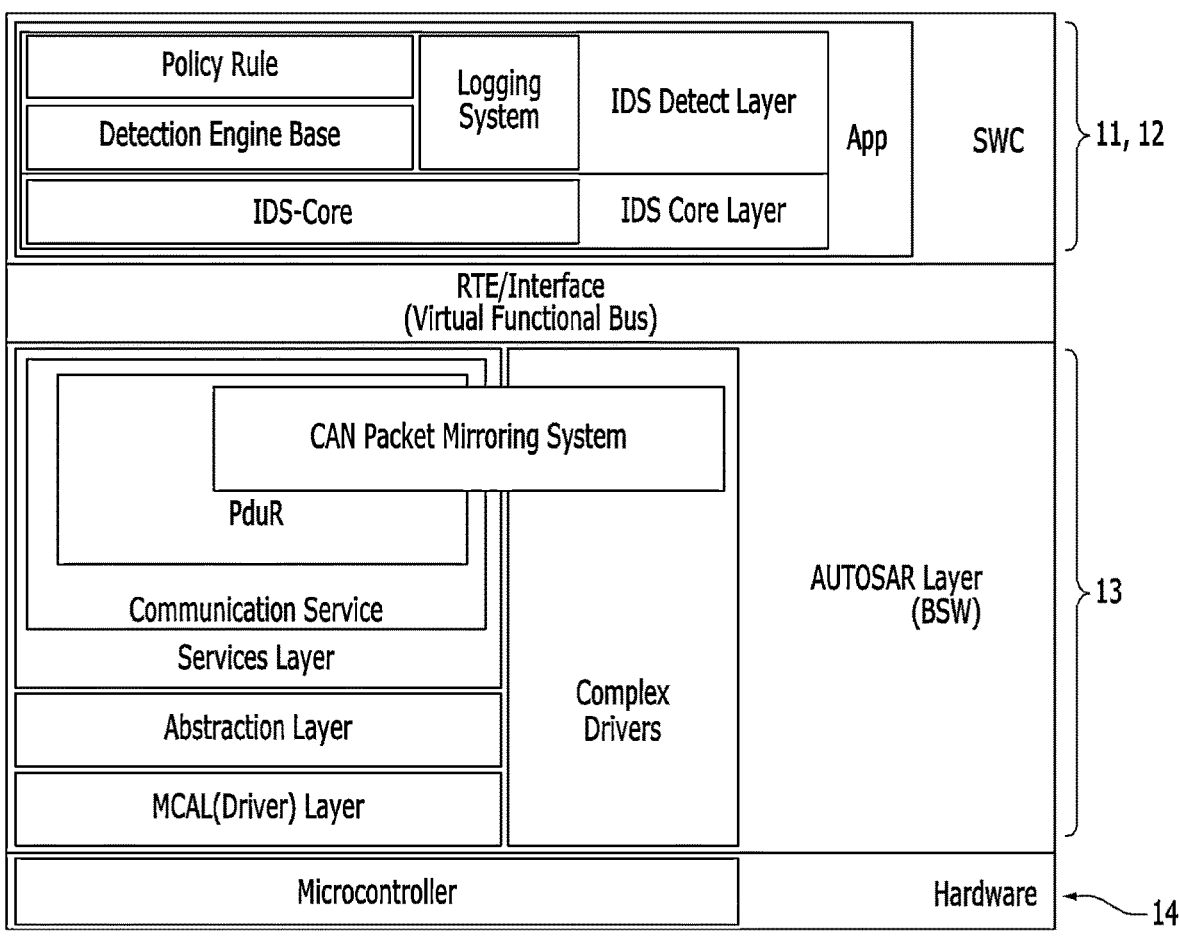

FIGS. 1 and 2 are schematic configuration diagrams of an intrusion detection system according to an exemplary embodiment of the present disclosure. Specifically, FIG. 1 is a diagram illustrating a structure of CAN IDS applied to a general ECU system.

Referring to FIG. 1, an intrusion detection system 10 according to an exemplary embodiment of the present disclosure may have a hierarchical structure including a first layer 11, a second layer 12, and a third layer 13. In addition, referring to FIG. 2, the intrusion detection system 10 according to an exemplary embodiment of the present disclosure may include a controller 14.

Specifically, according to an exemplary embodiment of the present disclosure, the first layer 11 of the intrusion detection system 10 may include an IDS detect layer. In addition, the second layer 12 of the intrusion detection system 10 may include an IDS core layer.

In this regard, the apparatus for constructing an intrusion detection system applied to CAN communication 100 (hereinafter referred to as the 'intrusion detection system construction apparatus 100') according to an exemplary embodiment of the present disclosure may define a policy rule 1000 applied to at least one of the IDS detect layer and the IDS core layer of the intrusion detection system 10, and operate to create a policy file 2 including the defined policy rule.

In other words, the IDS detect Layer and the IDS core layer of the intrusion detection system 10 may be layers performing a function of detecting and processing CAN messages based on the policy rule 1000 described in detail below.

Meanwhile, referring to FIG. 2, when the intrusion detection system 10 exemplarily adopts a system configuration based on a classic AUTOSAR platform, the intrusion detection system 10 may include a CAN packet monitoring system that is included in PduR of a communication service layer of basic software (BSW) or included in complex drivers.

For reference, in the description of the exemplary embodiment of the present disclosure, the intrusion detection system construction apparatus 100 defines the policy rule to be applied to the intrusion detection system 10, and may be mounted on a vehicle (not illustrated) or the like equipped with the intrusion detection system 10 in the form of a policy manager program to create the policy file 2 in which the relevant policy rules are reflected, but is not limited thereto.

Figure 3:
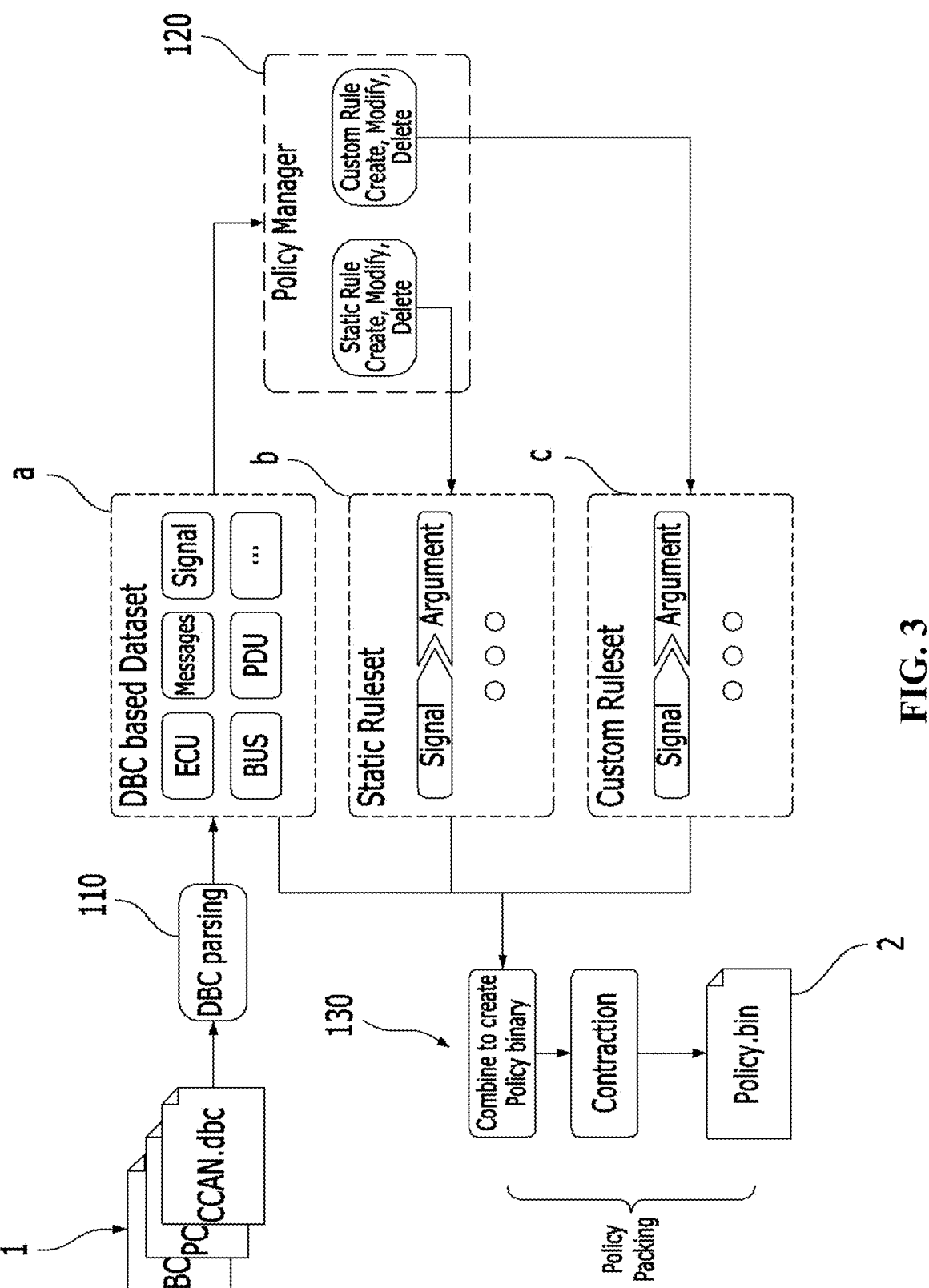
FIG. 3 is a conceptual diagram for describing an operation process of an apparatus for constructing an intrusion detection system applied to CAN communication according to an exemplary embodiment of the present disclosure.

FIG. 3 is a conceptual diagram for describing an operation process of an apparatus for constructing an intrusion detection system applied to CAN communication according to an exemplary embodiment of the present disclosure.

Referring to FIG. 3, the intrusion detection system construction apparatus 100 may extract standard information by parsing the input file 1 associated with the CAN communication. Specifically, the input file 1 provided to the intrusion detection system construction apparatus 100 may be a CAN DBC file, but is not limited thereto.

Specifically, the intrusion detection system construction apparatus 100 may obtain standard information (see 'a' in FIG. 3) including at least one of ECU information, PDU information, message information, signal information, and bus information from the input file 1. Meanwhile, the message information may be referred to differently as frame information.

In addition, the intrusion detection system construction apparatus 100 applies at least one of a static ruleset (see 'b' in FIG. 3) and a custom ruleset (see 'c' in FIG. 3) using the extracted standard information to set the policy rule 1000.

Specifically, the intrusion detection system construction apparatus 100 may set the policy rule 1000 that includes at least one of a first detection policy associated with bus information, a second detection policy associated with message information, and a third detection policy associated with signal information, among the standard information.

In this regard, the policy rule 1000 disclosed herein operates like a detection engine base of the intrusion detection system 10, and the policy rule 1000 may include a bus policy rule, a message policy rule, a signal policy rule, a periodic policy rule, etc., and each policy rule may be independent and it may be determined whether or not the policy rules operates according to the setting of the detection policy.

In addition, the intrusion detection system construction apparatus 100 may store the contents of the defined policy rule 1000 as the policy file 2 in the form of a policy binary which is an IDS policy rule file. In addition, the policy rule 1000 may have a buffering table and policy rule for each message according to the policy rule of the policy binary.

In addition, according to an exemplary embodiment of the present disclosure, the intrusion detection system construction apparatus 100 may set at least some of a plurality of predefined parameters as the static ruleset. In this regard, the static ruleset may mean a set of preset (predetermined) policy rules.

FIGS. 4A and 4B are exemplary diagrams of parameter types of static rulesets.

Referring to FIGS. 4A and 4B, the intrusion detection system construction apparatus 100 may separately create the first detection policy associated with the bus information, the second detection policy associated with the message information, and the third detection policy associated with the signal information using the extracted DBC information as the standard information.

FIGS. 5A to 5C are exemplary diagrams of parameters that can be adopted for each of first to third detection policies. Specifically, FIG. 5A is a diagram illustrating nine preset parameters that can be set for the first detection policy associated with the bus information, and FIG. 5B is a diagram illustrating four preset parameters that can be set for the second detection policy associated with the message information, and FIG. 5C is a diagram illustrating seven preset parameters that can be set for the third detection policy associated with the signal information.

Referring to FIGS. 5A to 5C, each parameter applied to the policy rule 1000 may be distinguished from each other through a rule name and a rule ID (detection ID).

As an example, referring to FIG. 5A, a parameter that can be set for the first detection policy may include 'Bus Load Too High (ID: 1)' for detecting when the bus traffic (messages for second (mps)) is greater than or equal to a reference value (upper bound), 'Bus Load Too Low (ID: 2)' for detecting when the bus traffic is smaller than or equal to the reference value (lower bound), 'Unknown Arb ID (arbitration) (ID: 3)' for detecting a message not defined in DBC, 'Signal Correlation Error (ID: 4)' for detecting abnormality of a gateway relay message, 'Recv Unknown ECU Message (ID: 5)' for detecting receipt of a message from an unidentifiable (unknown) ECU, 'Detected Dos Attack (ID: 6)' for detecting denial-of-service, 'Unknown DIAG ID (ID: 7)' for detecting an undefined diagnostic message, 'DIAG Message Flooding (ID: 8)' for detecting controller denial-of-service using a diagnostic message, 'DIAG Scanning Detected (ID: 9)' for detecting controller scanning attack using a diagnostic message, etc.

Likewise, the rule name, the rule ID (detection ID) and purpose/description of the parameters that can be set for each of the second and third detection policies are also illustrated in FIGS. 5B and 5C.

In addition, according to an exemplary embodiment of the present disclosure, in relation to the first detection policy, the intrusion detection system construction apparatus 100 may set the bus policy rule (first detection policy) in a detection rule flag of policy header information of the policy file 2 and operates according to the setting of the detection rule flag in the policy header in the IDS engine, and when an abnormality detection message occurs, rule ID (detection ID) values corresponding to each parameter of the bus detection policy are stored in a detection log buffer of a logging system.

In addition, according to an exemplary embodiment of the present disclosure, in relation to the second detection policy, the intrusion detection system construction apparatus 100 may set a message policy rule (second detection policy) in the detection rule flag of the message header and operates according to the setting of the detection rule flag of the message header in the IDS engine, and when the abnormality detection message occurs, the rule ID (detection ID) values corresponding to each parameter of the message detection policy are stored in the detection log buffer of the logging system.

In addition, according to an exemplary embodiment of the present disclosure, in relation to the third detection policy, the intrusion detection system construction apparatus 100 may set a signal policy rule (third detection policy) in a signal type of a signal header and operates according to the signal type setting of the signal header in the IDS engine, and when the abnormality detection message occurs, the rule ID (detection ID) values corresponding to each parameter of the signal detection policy are stored in the detection log buffer of the logging system.

In addition, according to another exemplary embodiment of the present disclosure, the policy setting unit 120 may define the custom parameters applicable as the custom ruleset. In addition, intrusion detection system construction apparatus 100 may determine at least one of the combination of the custom parameters and the set value. In this regard, the custom ruleset refers to a set of policy rules whose descriptions may be determined by the user.

In particular, in the case of the custom ruleset, the detection policy may be set based on the sensor information of the signal of the CAN message received by the intrusion detection system 10.

Figure 6:
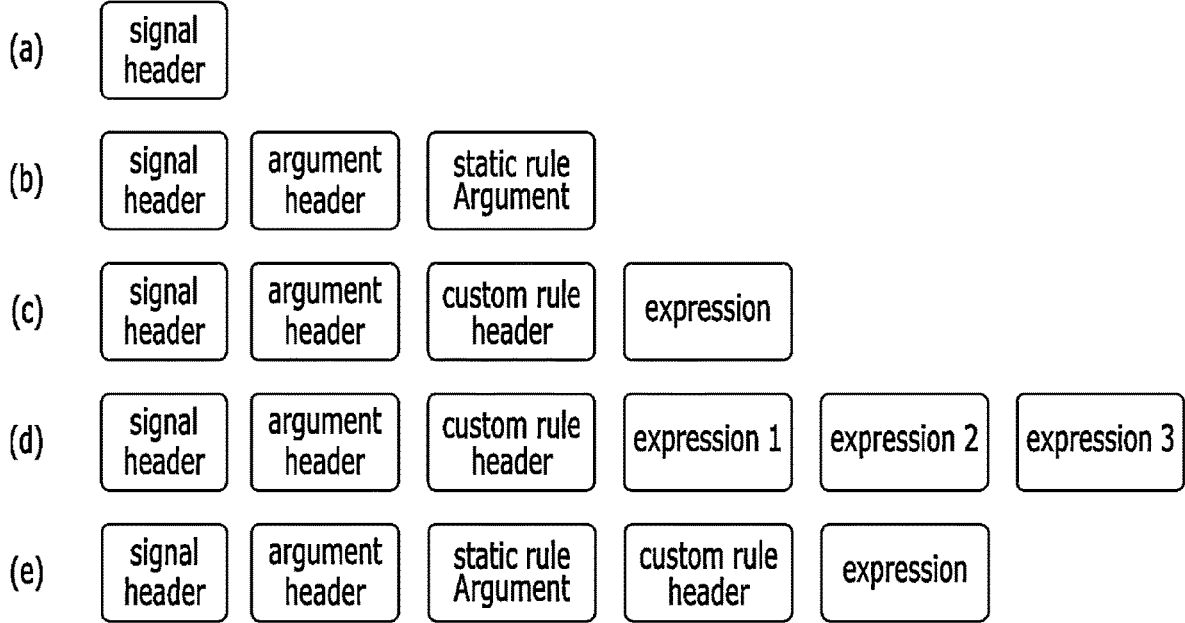
FIG. 6 is a conceptual diagram for describing types of policy rule combinations that can be set by a user.

FIG. 6 is a conceptual diagram for describing types of policy rule combinations that can be set by a user.

Referring to FIG. 6, the detection combination that can be set by the user using the custom ruleset may be determined through a plurality of methods illustrated in FIG. 6. Specifically, (a) of FIG. 6 illustrates a policy rule combination that omits an argument value and performs detection only by a type of signal such as counter and CRC, (b) of FIG. 6 illustrates the policy rule combination based on the static ruleset that requires detection argument for detection such as Enum and range detection, (c) of FIG. 6 illustrates the policy rule combination to which a single user-defined conditional expression based on the custom ruleset is applied, (d) of FIG. 6 illustrates the policy rule combination to which multiple user-defined conditional expressions based on the custom ruleset are applied, and (e) of FIG. 6 illustrates a complex policy rule combination to which both the static ruleset and custom ruleset are applied.

Meanwhile, in relation to the multiple user-defined conditional expression illustrated in (d) of FIG. 6, for example, when Expression 1, Expression 2, and Expression 3 are all satisfied, various logical combinations, such as detection settings (Expression 1 and Expression 2 and Expression 3), may be applied to the multiple user-defined conditions.

FIG. 7 is an exemplary diagram of adoptable parameters for the custom ruleset.

Referring to FIG. 7, the custom parameter includes, for example, a parameter for detecting when wheels are rotating while a shift lever is located in P, a parameter for detecting when there is an abnormal difference in the speed of each wheel, a parameter for detecting a situation where a battery voltage becomes very low while a vehicle is driving, a parameter for detecting abnormal situations where a hot wire and a ventilating seat are turned on simultaneously, etc., and may be defined in various ways depending on user settings to reflect various situations or scenarios that may be controlled using various sensing information and measurement information obtained from a vehicle (not illustrated) to which the intrusion detection system 10 is applied.

In addition, the intrusion detection system construction apparatus 100 may pack the standard information and the policy rule to create the policy file to be applied to the intrusion detection system 10.

In other words, the intrusion detection system construction apparatus 100 may set the policy rule 1000 based on at least one of the static ruleset and the custom ruleset using the parsed DBC information, and create the policy file 2 in the policy binary form through the packing that combines the information (DBC information and policy rule information) created in this way.

Hereinafter, the data structure of the policy file 2 created by the intrusion detection system construction apparatus 100 will be described in detail with reference to FIGS. 8 to 11.

Figure 8:
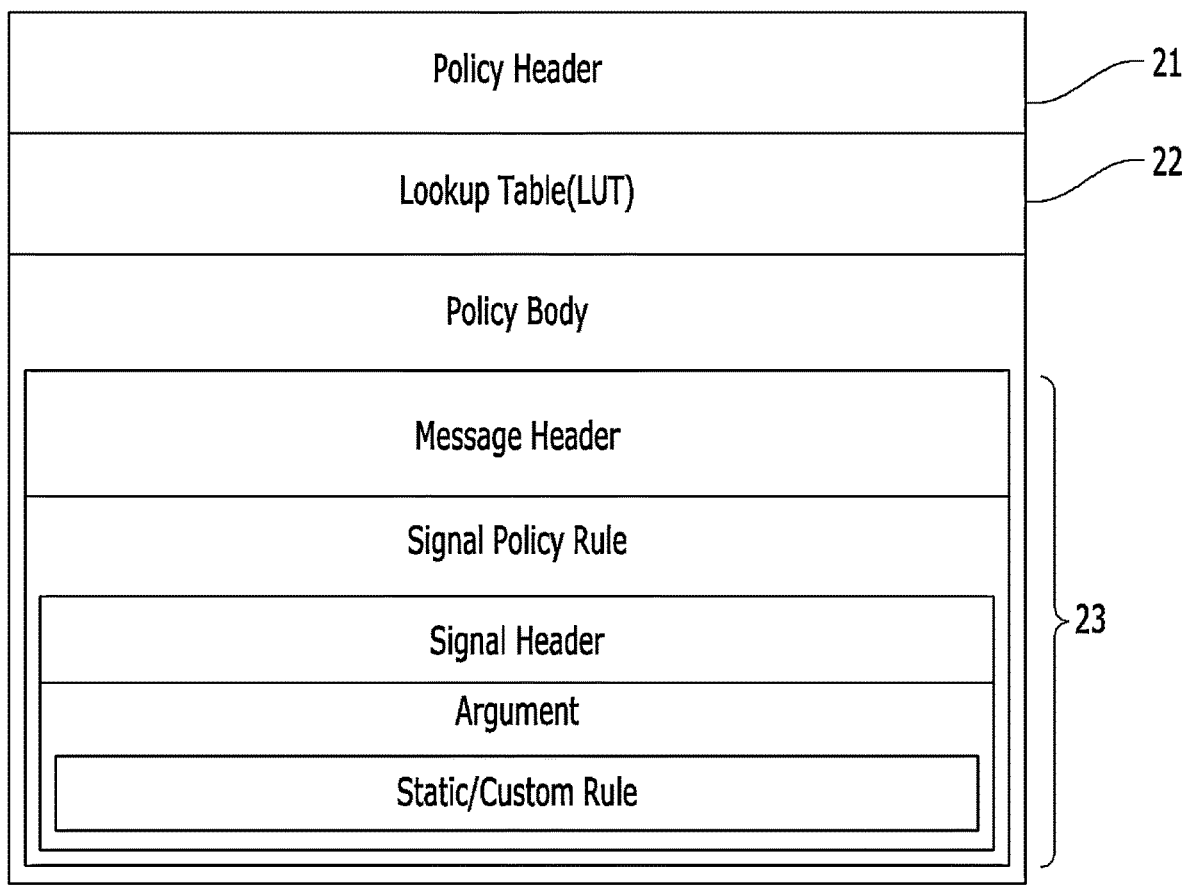
FIG. 8 is an exemplary diagram of a hierarchical structure of a policy file created by an apparatus for constructing an intrusion detection system applied to CAN communication according to an exemplary embodiment of the present disclosure.

FIG. 8 is an exemplary diagram of a hierarchical structure of a policy file created by an apparatus for constructing an intrusion detection system applied to CAN communication according to an exemplary embodiment of the present disclosure.

Referring to FIG. 8, the intrusion detection system construction apparatus 100 may create, as the policy file 2, the policy binary having a hierarchical structure including policy header information 21, lookup table information 22, and policy body information 23. In particular, the policy body information 23 may include information on the policy rule 1000 applied to each CAN message.

FIG. 9 is a diagram illustrating a data structure of policy header information of the policy binary.

Referring to FIG. 9, the policy header information 21 is located at the beginning of the policy file 2 and may be composed of policy version, creation date and time, detection settings to be applied to CAN bus, etc. According to an exemplary embodiment of the present disclosure, policies for a plurality (e.g., 6, etc.) of preset bus information may be integrally set in the policy header information 21, and the policy rule created based on the bus information extracted from the DBC may be reflected. By way of example, the policy header information 21 has a size of 48 bytes and may include the following data field.

First, the policy version (8 bytes) is a data field representing the version information of the policy binary, and may include, for example, vehicle type information (2 bytes), major version information (2 bytes), minor version information (2 bytes), detailed version information (2 bytes), etc.

In addition, the created timestamp (4 bytes) is a data field that represents information on the creation date (time) of the policy binary, and may use a notation method, such as 1900-01-01.00:00:00~2037-12-31.23:59:59.

In addition, the timestamp may further include a bus count (2 bytes) data field representing the total number of buses, a message count data field representing the total number of messages, a buf-5-rec-num (2 bytes) data field representing the number of messages in which the buffering number of the CAN standard messages is 5, a buf-10-rec-num (2 bytes) data field representing the number of messages in which the buffering number of the CAN standard messages is 10, a fd-buf-5-rec-num (2 bytes) data field representing the number of messages in which the buffering number of CAN FD messages is 5, a fd-buf-10-rec-num (2 bytes) data field representing the number of messages in which the buffering number of CAN FD messages is 10, etc.

In addition, when setting the policy rule for a plurality of preset CAN bus information, a bus number (1 byte) data field representing the CAN bus number, a detection rule flag (1 byte) data field representing the policy rule setting flag to be applied to the bus, etc., may be applied.

In this regard, FIG. 10 is a diagram illustrating a data structure of a bus detection rule flag.

Referring to FIG. 10, the bus detection rule flag may include a 'Bus detect on/off' field to determine whether all the policy rules for the bus itself will be applied, and when the field is 0, the policy rule is excluded from all the detection targets, and the policy rule may be applied only when the field is 1.

In addition, the bus detection rule flag may include an 'Unknown arbitration ID detect' field for detecting when a message with an arbitration ID that does not exist in the detection policy enters the bus, a 'bus load detect' field for detecting when the bus load is outside the appropriate range, an 'Invalid DIAG detect' field for detecting invalid diagnostic messages flowing into the bus, a 'DOS attack detect' field for detecting denial-of-service (DOS) on the bus, an 'Unknown DIAG ID detect' field for detecting a diagnostic message that does not exist in the DBC, a 'DIAG Flooding detect' field for detecting controller service attacks using the diagnostic message, a 'DIAG Scanning detect' field for detecting controller scanning attacks using the diagnostic message, etc.

For reference, in the case of the 'Bus load detect' field, additional settings for minimum/maximum load values may be required. In this regard, a maximum load mps (1 byte) field, which is a value that sets the maximum load on the bus, and a minimum load mps (1 byte) field, which is a value that sets the minimum load on the bus, may be defined, and the maximum load setting value and the minimum load setting value may exemplarily be set within a range from 0 to 25500 mps on a $\frac{1}{100}$ scale in the form of an mps value, but is not limited thereto.

In addition, this bus policy rule may be set by the intrusion detection system construction apparatus 100, and the operation of the IDS engine of the intrusion detection system 10 may vary depending on the value of the policy rule setting flag, and when abnormal detection may occur, the detection ID value of the bus detection parameter may be stored in the log buffer.

FIG. 11 is a diagram illustrating a data structure of lookup table information of the policy binary.

Referring to FIG. 11, the lookup table information 22 may include the set policy rule 1000 and information for storing and retrieving data of the received message in the buffer.

Specifically, the lookup table information 22 stores details (descriptions) on the CAN information extracted from the DBC. In this case, a lookup key may be created with a combination of CAN bus+arbitration ID (CAN message ID), and the policy body information 23 in which the detection policy of the CAN message is stored and the information of the buffering table may be stored. To this end, the lookup table information 22 may be designed as a 6-byte data structure, and created as many as the total number of messages in the DBC.

Meanwhile, when describing each data field of the lookup table information 22, the 'lookup key (2 bytes)' field, which is a key for searching for the policy body and the buffering table that are a policy rule, may be composed of, as the CAN bus ID, a 'bus ID (5 bits)' field representing the bus ID stored in the policy header and an 'arbitration ID (11 bits)' which represents the CAN message ID, and may include a 'policy index (2 bytes)' field representing the index information of the policy rule in the policy body information 23 and an 'entry index (2 bytes)' field that represents index information on the buffering table, etc.

In addition, the entry index field may be composed of a 'buffer type (2 bits)' field representing information for storing a CAN message in the buffering table and a 'buffer index (14 bits)' field representing address information of the buffering table.

In summary, the operation of storing the received CAN message in the buffering table may be performed through the policy index and entry index information of the policy body information 23.

More specifically, when the CAN message is received, the CAN message is stored in the buffering table based on the buffer type and index information in the lookup table through the lookup key (bus+arbitration ID). The CAN message is divided into standard and FD, and the buffering table has a storage space for all the CAN messages in the lookup table, and the storage location varies depending on the type of messages. The buffering table is allocated to a predetermined RAM area (fixed address area) during the initialization process. When the CAN message is received, it is determined whether the CAN message is put in a table set with 5 buffers or a table set with 10 buffers through the buffer type corresponding to the CAN message in the lookup table. The received message is a CAN standard message, and when the buffer type is 00, the received message is stored in the address corresponding to the buffer index number in the buf-5-rec-num table. A first item in the lookup table is an item used when detecting the message that are not registered in the DBC. The corresponding item is designated as an item that requires buffering and is allocated to the buffering table.

In addition, when the CAN message is stored in the buffering table, the policy rule of the CAN message in the policy body is searched through the information of the policy index. Through the searched information, it may be determined whether the CAN message is valid data.

The policy body information 23 may include the policy rule for each CAN message, and may be composed of the 'message header' field and the 'signal policy rule' field to set the policy rule for each CAN message.

Specifically, the message header field of the policy body information 23 is commonly used for the CAN standard and CAN FD. Based on the information obtained from the DBC, attribute values related to the policy rule (normal cycle, upper/lower bound range, policy rule use flag) are added, and the data structure of the message header field is 5 bytes and may be configured as follows.

Specifically, the message header field may include a CAN FD (1 bit) field which is determined as 0 for CAN standard message and 1 for CAN FD, a periodic (1 bit) field that is determined to be 1 when the CAN message is periodic, an event (1 bit) field which is determined to be 1 when the CAN message is an event, a reverse (1 bit) field representing when the message inflow direction is reversed and incorrect, a DLC (4 bits) field representing a data length of the CAN message, an average period (1 byte) field representing the average period of the message (can be set in units of 10 ms up to 0 to 2550 ms in $\frac{1}{10}$ scale), a signal count (6 bits) field representing the number of signals included in the message, an upper period margin (5 bits) field representing the upper limit correction value for determination the average period (can be set up to 32 ms in units of 1 ms), a lower period margin (5 bits) field representing the lower limit correction value for determining the average period (can be set up to 32 ms in units of 1 ms), a detection rule flag (4 bit) fields representing DLC anomaly detection activation, cycle detection activation, etc., a message body size (12 bits) field representing the size of the signal policy rule after the message header (up to 4095 bytes), etc.

In addition, the signal policy rule field may include a signal header in which basic signal information such as the bit position, length, sign, and byte order of the signal and the signal type are stored. In this case, the signal type may be determined from the type found by guessing from the DBC or analyzing dump data.

Meanwhile, the signal header is commonly used for the CAN standard and CAN FD, and at a maximum of 64 bytes, the signal starting position should not exceed 0 to 511 and the maximum signal size should not exceed 128 bits (16 bytes). The data structure of the signal header may specifically include a bit index (9 bits) field having a size of 0 to 512, a length (7 bits) field having a size of 0 to 127, an order (1 bit) field, a sign (1 bit) field, a signal type (6 bits) field having a size of 0 to 63, a signal body size (1 byte) field having a size of 0 to 255, etc.

Also, in relation to the type of signal, 'enum (0x00)' is an enumeration type signal, which has a few values and limited characteristics (e.g., 0: inactive, 1: on, 2: off, 3: invalid, etc.), 'counter (0x01)' is a signal of a counter pattern in which the change in value increases sequentially, 'CRC (0x02)' is a signal that requires CRC calculation and has a bit range used for CRC calculation that should be known, 'const (0x03)' is a signal for expressing an unused bit area, and has characteristic of having no separate information in the actual DBC, 'sensor (0x04)' is a signal with a general irregular sensor value and has a range of values, and 'binary (0x05)' is a signal expressed as 0 or 1 as a signal having a length of 1 bit.

In addition, the detection argument is located after the signal header and contains argument value information to be used in the policy rule. Since various argument values may come depending on the type of policy rule, it is designed to be implemented flexibly using argument codes. The detection argument is composed of a detect header and a detect body, and the detect header is a combination of an argument code and a sub code, and a value type and type of the argument are predetermined.

Each data field of the detection argument may specifically include 'argument code (5 bits)' field, a 'sub code (3 bits)' field, an 'argument body size (1 byte)' field, an 'argument body (2 bytes)' field, etc.

Figure 12:
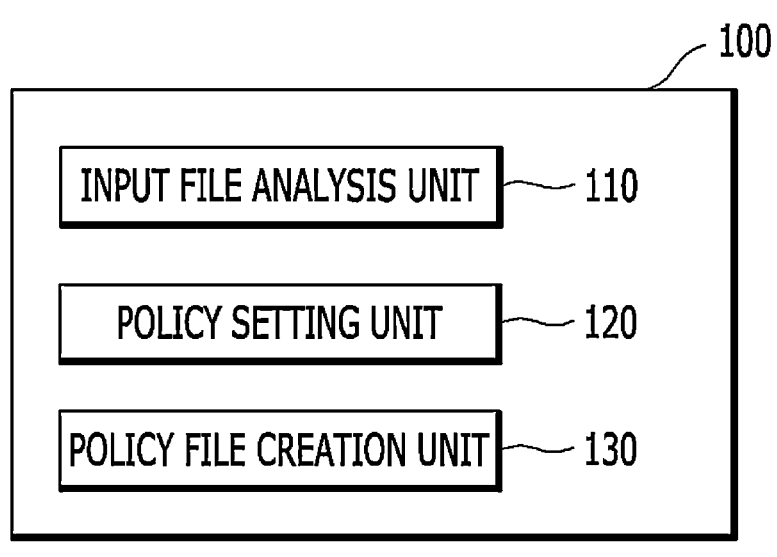
FIG. 12 is a schematic configuration diagram of the apparatus for constructing an intrusion detection system applied to CAN communication according to an exemplary embodiment of the present disclosure.

FIG. 12 is a schematic configuration diagram of the apparatus for constructing an intrusion detection system applied to CAN communication according to an exemplary embodiment of the present disclosure.

Referring to FIG. 12, the construction apparatus 100 may include an input file analysis unit 110, a policy setting unit 120, and a policy file creation unit 130.

The input file analysis unit 110 may extract standard information by parsing the input file 1 associated with CAN communication.

Specifically, the input file analysis unit 110 may acquire standard information including at least one of ECU information, PDU information, message information, signal information, and bus information from the input file 1.

The policy setting unit 120 may set the policy rule by applying at least one of the static ruleset and the custom ruleset using the extracted standard information.

Specifically, the policy setting unit 120 may set the policy rule that includes at least one of the first detection policy associated with the bus information, the second detection policy associated with the message information, and the third detection policy associated with the signal information, among the standard information.

In this regard, according to an exemplary embodiment of the present disclosure, the policy setting unit 120 may set at least some of the plurality of parameters predefined as the static ruleset.

In addition, according to another exemplary embodiment of the present disclosure, the policy setting unit 120 may define the custom parameters applicable as the custom ruleset. In addition, the policy setting unit 120 may determine at least one of the combination of the custom parameters and the set value.

In addition, the policy file creation unit 130 may pack the standard information and the policy rule to create the policy file to be applied to the intrusion detection system 10.

Specifically, the policy file creation unit 130 may generate, as a policy file, a policy binary having a hierarchical structure including policy header information, lookup table information, and policy body information.

Hereinafter, the operation flow of the present disclosure will be briefly described based on the details described above.

Figure 13:
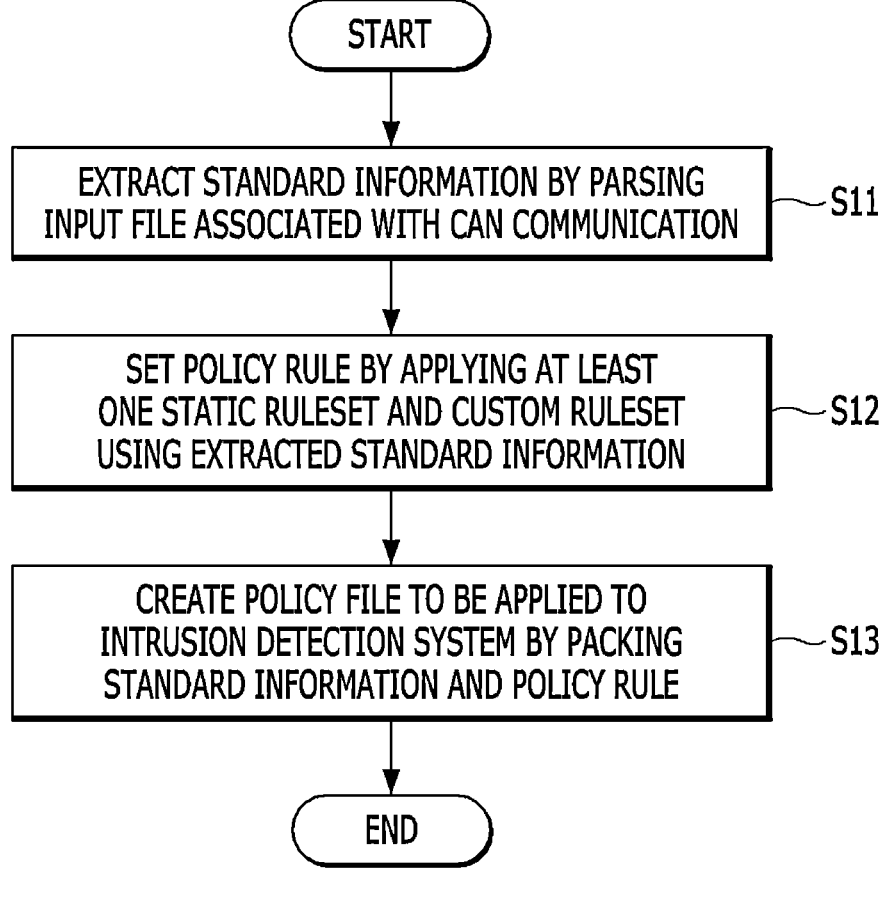
FIG. 13 is an operation flow chart of a method for constructing an intrusion detection system applied to CAN communication according to an exemplary embodiment of the present disclosure.

FIG. 13 is an operation flow chart of a method for constructing an intrusion detection system applied to CAN communication according to an exemplary embodiment of the present disclosure.

The method for constructing an intrusion detection system applied to CAN communication shown in FIG. 13 may be performed by the construction apparatus 100 described above. Therefore, even if the contents are omitted below, the contents described with respect to the construction apparatus 100 may be equally applied to the description of the method for constructing an intrusion detection system applied to CAN communication.

Referring to FIG. 13, in step S11, the input file analysis unit 110 may extract the standard information by parsing the input file 1 associated with the CAN communication.

Specifically, in step S11, the input file analysis unit 110 may acquire standard information including at least one of ECU information, PDU information, message information, signal information, and bus information from the input file 1.

Next, in step S12, the policy setting unit 120 may set the policy rule by applying at least one of the static ruleset and the custom ruleset using the extracted standard information.

Specifically, in step S12, the policy setting unit 120 may set the policy rule that includes at least one of the first detection policy associated with the bus information, the second detection policy associated with the message information, and the third detection policy associated with the signal information, among the standard information.

According to an exemplary embodiment of the present disclosure, in step S12, the policy setting unit 120 may set at least some of the plurality of parameters predefined as the static ruleset.

According to another exemplary embodiment of the present disclosure, in step S12, the policy setting unit 120 may define the custom parameters applicable as the custom ruleset. In addition, in step S12, the policy setting unit 120 may determine at least one of the combination of the custom parameters and the set value.

Next, in step S13, the policy file creation unit 130 may pack the standard information and the policy rule to create the policy file to be applied to the intrusion detection system 10.

Specifically, in step S13, the policy file creation unit 130 may generate, as a policy file, a policy binary having a hierarchical structure including policy header information, lookup table information, and policy body information.

In the above description, steps S11 to S13 may be further divided into additional steps or combined into fewer steps, according to the implementation example of the present disclosure. Also, some steps may be omitted if necessary, and an order between steps may be changed.

The method for constructing an intrusion detection system applied to CAN communication according to the exemplary embodiment of the present disclosure may be implemented in the form of program commends that may be executed through various computer means and recorded on a computer-readable medium. The computer-readable medium may include a program instruction, a data file, a data structure or the like, alone or a combination thereof. The program commands recorded in the computer-readable recording medium may be especially designed and configured for the present disclosure or be known to those skilled in a field of computer software. Examples of the computer-readable recording medium may include magnetic medium such as a hard disk, a floppy disk, or a magnetic tape; optical medium such as a compact disk read only memory (CD-ROM) or a digital versatile disk (DVD); magneto-optical medium such as a floptical disk; and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler. The above-described hardware device may be configured to be operated as one or more software modules to perform an operation according to the present disclosure, and vice versa.

In addition, the above-described method for constructing an intrusion detection system applied to CAN communication may also be implemented in the form of a computer program or application executed by a computer stored in a recording medium.

The above description of the present disclosure is for illustrative purposes, and those skilled in the art to which the present disclosure pertains will understand that it is possible to be easily modified to other specific forms without changing the technical spirit or essential features of the present disclosure. Therefore, it should be understood that the above-described exemplary embodiments are exemplary in all aspects but are not limited thereto. For example, each component described as a single type may be implemented in a distributed manner, and similarly, components described as distributed may be implemented in a combined form.

It is to be understood that the scope of the present disclosure will be defined by the claims rather than the above-mentioned description and all modifications and alternations derived from the claims and their equivalents are included in the scope of the present disclosure.

What is claimed is:

1. A method for constructing an intrusion detection system applied to controller area network (CAN) communication, comprising:

extracting standard information by parsing an input file associated with the CAN communication;

setting a policy rule by applying a static ruleset and a custom ruleset using the extracted standard information, wherein the custom ruleset is a set of policy rules whose descriptions are determined by a user; and creating a policy file to be applied to the intrusion detection system by packing the standard information and the policy rule, wherein the standard information includes at least one of electronic control unit (ECU) information, protocol data unit (PDU) information, message information, signal information, bus information, or any combination thereof, wherein the policy rule includes at least one of a first detection policy associated with the bus information, a second detection policy associated with the message information, and a third detection policy associated with the signal information, wherein each of the first detection policy, the second detection policy, and the third detection policy is independent of each other according to the setting of the policy rule, wherein the setting of the policy rule includes:

defining custom parameters applicable as the custom ruleset; and determining at least one of a combination of the custom parameters and a set value, and wherein the custom parameters include a first parameter for detecting when one or more wheels are rotating while a shift lever is located in park, a second parameter for detecting when there is an abnormal difference in a rotation speed of each wheel, a third parameter for detecting abnormal situations where a hot wire and a ventilating seat are turned on simultaneously, a fourth parameter for detecting when the one or more wheels rotate in a front direction while the shift lever is in reverse, a fifth parameter for detecting when a torque request value is a physically impossible value, and a sixth parameter for detecting when an engine temperature is outside of a normal range.

2. The method of claim 1, wherein, in the setting of the policy rule, the static ruleset is set to include predefined parameters.

3. The method of claim 1, wherein the policy file is a policy binary.

4. The method of claim 3, wherein the policy binary is created in a hierarchical structure including policy header information, lookup table information, and policy body information.

5. The method of claim 1, wherein the policy file is applied to at least one of an intrusion detection system (IDS) core layer and an IDS detect layer of the intrusion detection system.

6. The method of claim 1, wherein the input file includes a controller area network database (CAN DBC) file.

7. An apparatus for constructing an intrusion detection system applied to controller area network (CAN) communication, comprising:

an input file analysis unit that extracts standard information by parsing an input file associated with the CAN communication;

a policy setting unit that sets a policy rule by applying a static ruleset and a custom ruleset using the extracted standard information, wherein the custom ruleset is a set of policy rules whose descriptions are determined by a user; and a policy file creation unit that generates a policy file to be applied to the intrusion detection system by packing the standard information and the policy rule, wherein the standard information includes at least one of electronic control unit (ECU) information, protocol data unit (PDU) information, message information, signal information, bus information, or any combination thereof, wherein the policy rule includes at least one of a first detection policy associated with the bus information, a second detection policy associated with the message information, and a third detection policy associated with the signal information, wherein each of the first detection policy, the second detection policy, and the third detection policy is independent of each other according to the setting of the policy rule, wherein the policy setting unit defines a-custom parameters applicable as the custom ruleset and determines at least one of a combination of the custom parameters and a set value, and wherein the custom parameters include a first parameter for detecting when one or more wheels are rotating while a shift lever is located in park, a second parameter for detecting when there is an abnormal difference in a rotation speed of each wheel, a third parameter for detecting abnormal situations where a hot wire and a ventilating seat are turned on simultaneously, a fourth parameter for detecting when the one or more wheels rotate in a front direction while the shift lever is in reverse, a fifth parameter for detecting when a torque request value is a physically impossible value, and a sixth parameter for detecting when an engine temperature is outside of a normal range.

8. The apparatus of claim 7, wherein the policy setting unit sets the static ruleset to include predefined parameters.

9. The apparatus of claim 7, wherein the policy file is a policy binary created in a hierarchical structure including policy header information, lookup table information, and policy body information.

10. An apparatus for constructing an intrusion detection system applied to controller area network (CAN) communication, comprising:

at least one memory comprising instructions and at least one hardware processor to execute the instructions within at least one memory to implement:

extracting standard information by parsing an input file associated with the CAN communication;

setting a policy rule by applying a static ruleset and a custom ruleset using the extracted standard information, wherein the custom ruleset is a set of policy rules whose descriptions are determined by a user; and creating a policy file to be applied to the intrusion detection system by packing the standard information and the policy rule, wherein the standard information includes at least one of electronic control unit (ECU) information, protocol data unit (PDU) information, message information, signal information, bus information, or any combination thereof, wherein the policy rule includes at least one of a first detection policy associated with the bus information, a second detection policy associated with the message information, and a third detection policy associated with the signal information, wherein each of the first detection policy, the second detection policy, and the third detection policy is independent of each other according to the setting of the policy rule, wherein the setting of the policy rule includes:

defining custom parameters applicable as the custom ruleset; and determining at least one of a combination of the custom parameters and a set value, and wherein the custom parameters include a first parameter for detecting when one or more wheels are rotating while a shift lever is located in park, a second parameter for detecting when there is an abnormal difference in a rotation speed of each wheel, a third parameter for detecting abnormal situations where a hot wire and a ventilating seat are turned on simultaneously, a fourth parameter for detecting when the one or more wheels rotate in a front direction while the shift lever is in reverse, a fifth parameter for detecting when a torque request value is a physically impossible value, and a sixth parameter for detecting when an engine temperature is outside of a normal range.

* * * * *